United States Patent

[11] 3,561,754

| [72] | Inventors | Bernard W. Gaffron<br>New Brighton;<br>Logan D. Gilman, St. Paul; Leo J. Schulz,<br>Woodbury, Minn. |
|---|---|---|
| [21] | Appl. No. | 849,129 |
| [22] | Filed | Aug. 11, 1969 |
| [45] | Patented | Feb. 9, 1971 |
| [73] | Assignee | Minnesota Mining and Manufacturing Company<br>St Paul, Minn.<br>a corporation of Delaware<br>Continuation-in-part of application Ser. No. 756,992, Sept. 3, 1968. |

[54] SHEET COLLATION DISTRIBUTOR
11 Claims, 6 Drawing Figs.

[52] U.S. Cl. .................................................. 270/58,
271/64
[51] Int. Cl. .................................................. B65h 39/02

[50] Field of Search ............................................. 270/58;
93/93

[56] References Cited
UNITED STATES PATENTS

| 2,951,697 | 9/1960 | Bernart et al. ................. | 270/58 |
| 3,076,647 | 2/1963 | Lowe et al. .................... | 270/58 |
| 3,229,599 | 1/1966 | Lowe............................. | 93/93 |

*Primary Examiner*—Lawrence Charles
*Attorney*—Kinney, Alexander, Sell, Steldt and Delahunt ABSTRACT: A collation distributor for use with a document copying machine which distributor is adapted to receive and collate the copies of the document made by the machine and receive the original sheets of the document. The distributor comprises a plurality of trays for receiving the copies, means for directing the copies of each original sheet seriatim into the trays, and control means for resetting the sheet-directing means with relation to the trays in response to the discharge of each successive original sheet of the document from the copying machine prior to commencement of the next run.

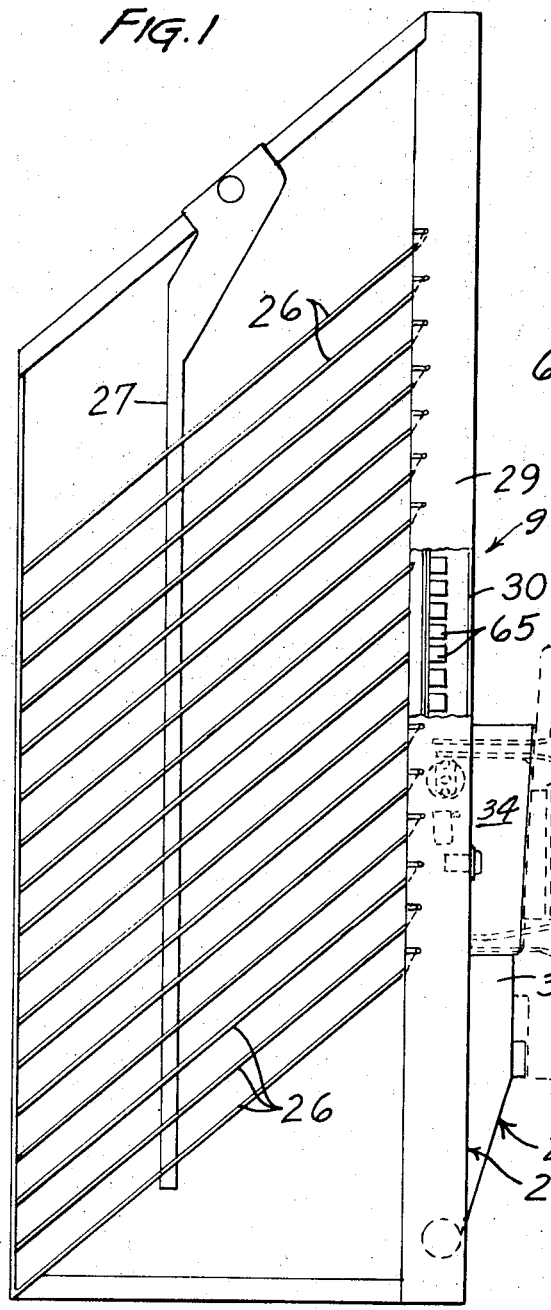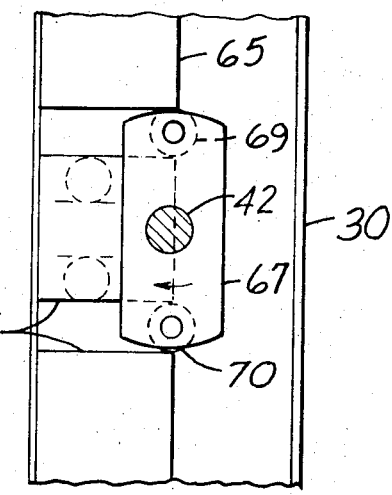

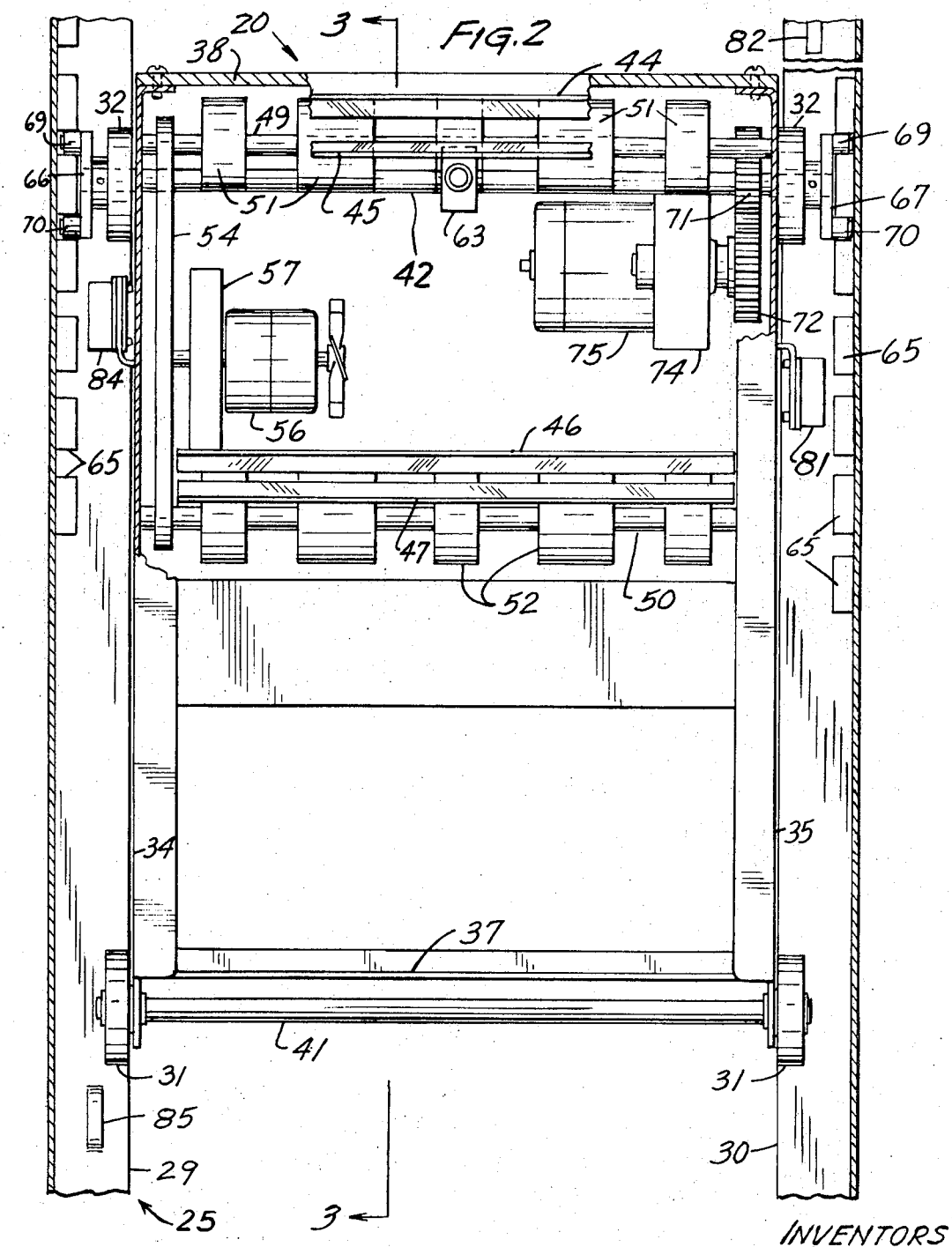

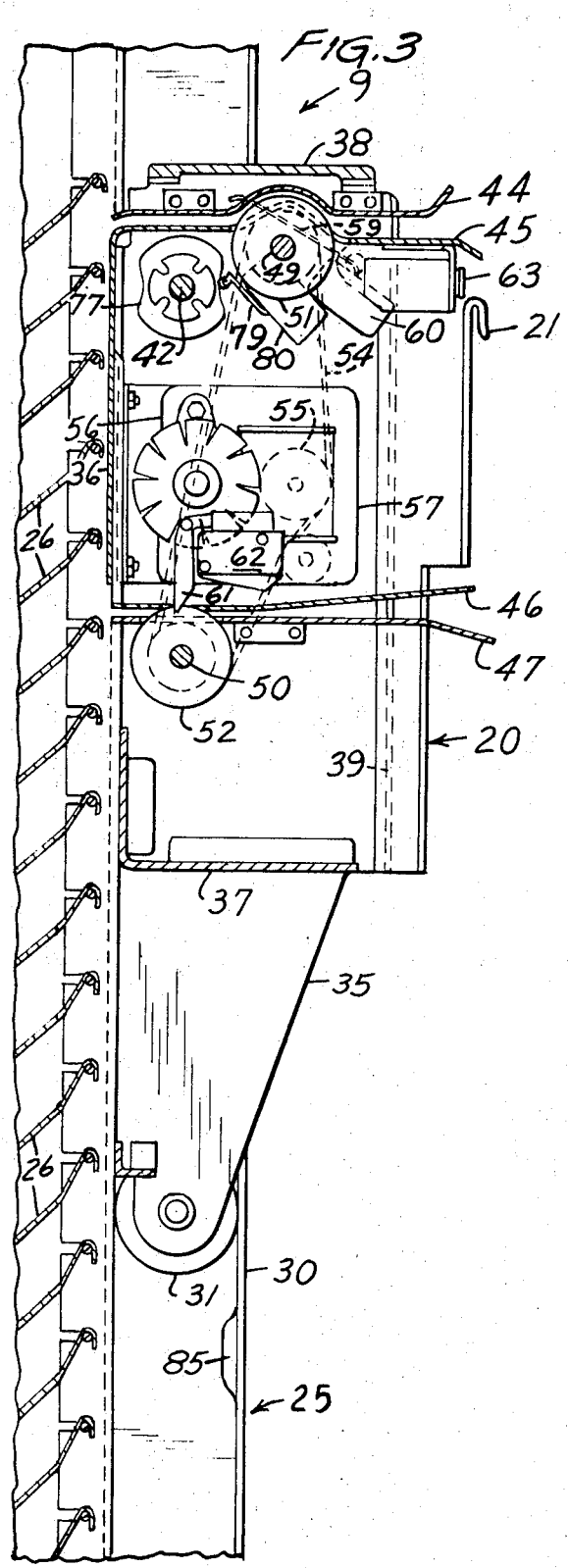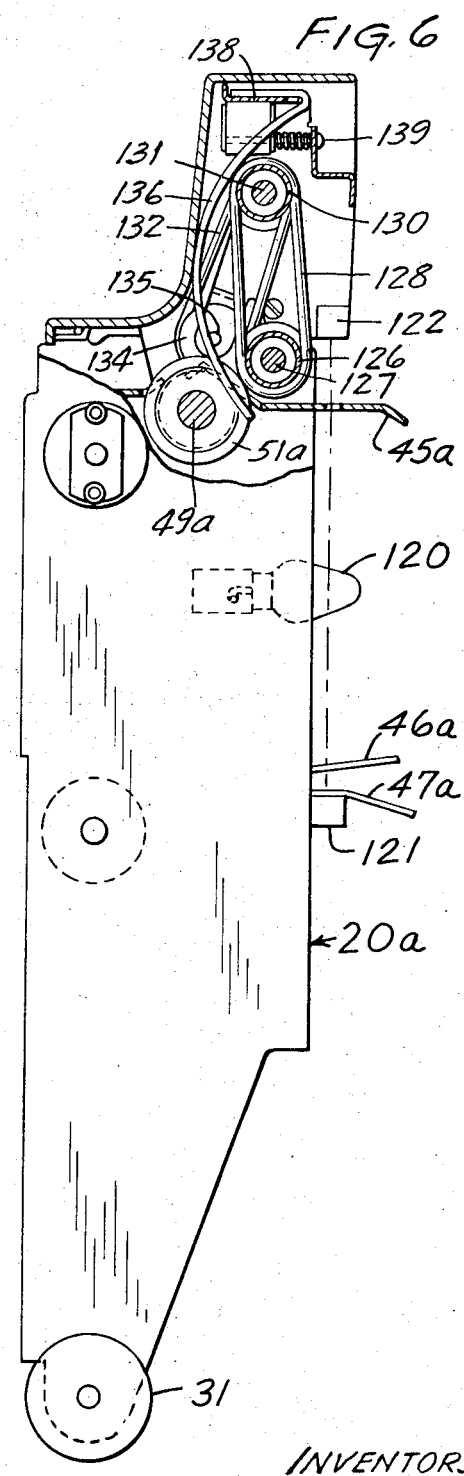

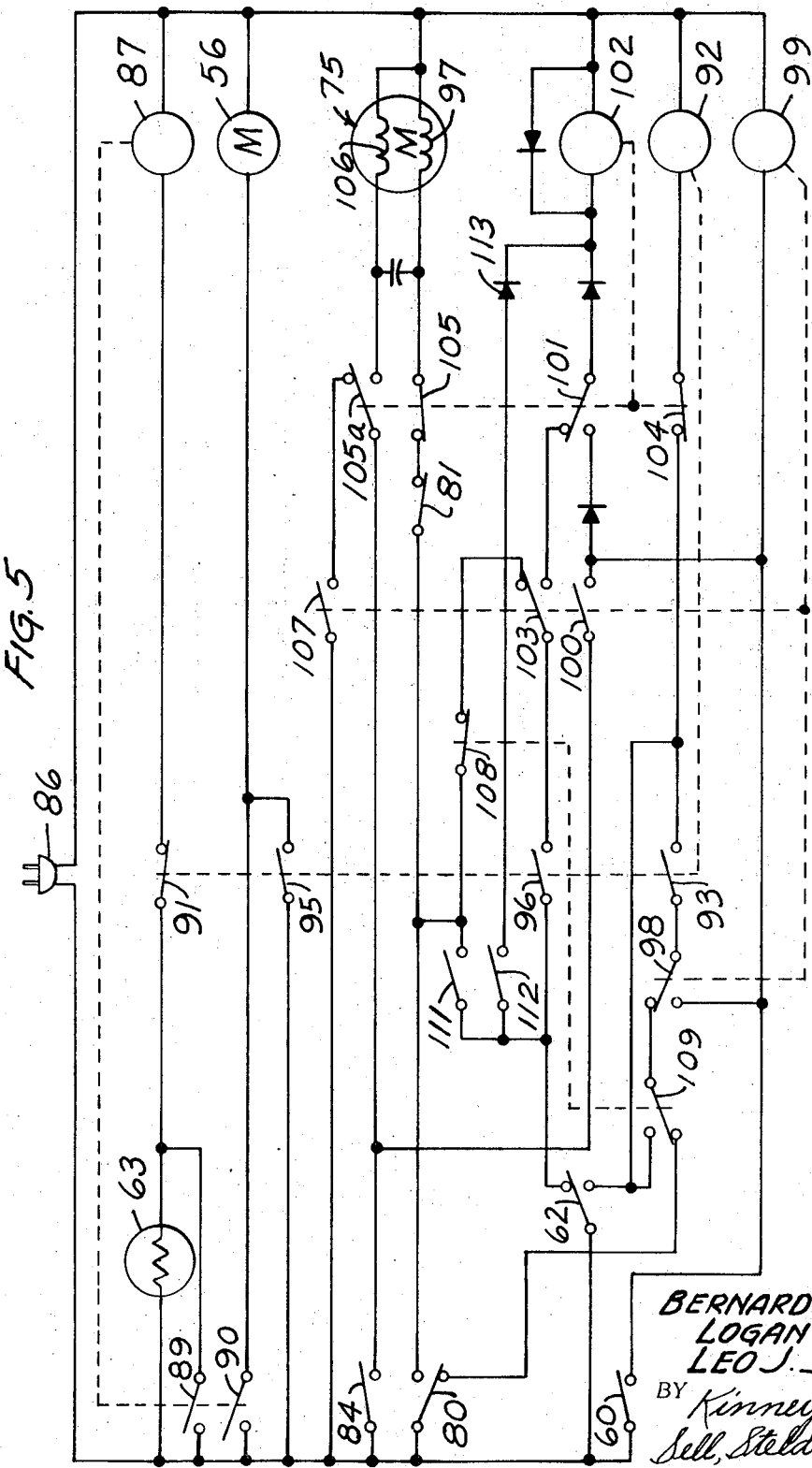

SHEET COLLATION DISTRIBUTOR

This application is a continuation-in-part of application Ser. No. 756,992 filed Sept. 3, 1968.

This invention relates to an apparatus affording the collation of sheet material and in one aspect relates to a distributor for use with an automatic copying machine to afford the collation of the copies of an original document as the same are made by said copying machine.

With the advance of technology concerning machines for duplication of documents, and particularly machines useful in the copying of graphic intelligence imparted to a sheet of opaque material such as paper, the use of copying machines in offices has become widespread. The copying machines themselves have improved to the state or progressed in quality where the production of a copy or a number of copies by the machine is automatic. In making a number of copies however, of a multipage document, it is generally necessary for the operator to feed the sheets of the original document one at a time into the machine whereupon the machine may make one or a number of copies of each page. It is also necessary, upon receipt of the copies of each sheet of the document, that the individual collate the copies into sets to conform to the original document. This all involves time and effort on the part of the clerical staff in most office situations. It is therefore desirable to solve this problem by the provision of equipment, adapted for use with existing copying machines, capable of performing the collating operations presently required of personnel.

The present invention provides a new and novel piece equipment for the distribution of the copies as they are received from a copy machine in such a manner as to collate the copies and to receive and/or collect the original sheets as they are discharged from the copy machine. The copy machine may or may not include means for automatically feeding the sheets forming the original document successively into the machine, but in any event, the present invention affords a labor-saving, time-saving copy machine accessory device for the production of multiple copies of documents.

The device of the present invention affords a mechanism which is simple in design and construction and automatic in operation and one controlled independently of the operation of the programming control means of the copying machine.

Collating machines per se are not new and have been used for many years in the printing industry. Examples of prior collating machines are disclosed in U.S. Pat. Nos. 3,273,882, Sept. 20, 1966; 3,315,957, issued Apr. 25, 1967; and 3,356,362, issued Dec. 5, 1967. Each of 1967. devices show means for receiving the printed sheet material and distributing individual similar sheets to individual trays or cubicles ready for binding or other handling. In each instance the sheets may be driven around a predetermined path and diverted from this path into successive trays, or the the transport for the sheet is indexed to deposit one sheet successively in each of the trays in a stack. As will be noted from a cursory examination of these devices, they are all controlled by a counting mechanism to reset the device at the beginning of each run and to deliver one sheet from each run into some or all of the trays or cubicles and that the number of trays exceed the number usually required for most office copying requirements.

The invention of the present application therefore fills a present need and provides a novel sheet distributor and system for handling the duplication of multipage documents.

The invention of the present application affords a collating device to collate the original copy by returning and inverting the sheets as well as collating the copies made of a said original.

The above and added advantages of the present invention will be more apparent after reading the following detailed description which refers to the accompanying drawing wherein:

FIG. 1 is a front elevational view, partly in section, illustrating a collation distributor according to the present invention and diagrammatically illustrating a portion of a document copying machine;

FIG. 2 is a fragmentary side view, partly in section, illustrating the sheet receiving, driving and control part of the distributor of the present invention;

FIG. 3 is a fragmentary vertical sectional view taken approximately along the line 3—3 of FIG. 2;

FIG. 4 is a detail view of the stepping means to afford the desired relative movement;

FIG. 5 is an electrical schematic for the distributor of the present invention; and FIG. 6 is a fragmentary front elevational view, partly in section, of a modified form of the control frame of the distributor.

Referring now to the drawings, wherein like reference numerals refer to like parts throughout the several views, the sheet collation distributor, generally designated by numeral 9, of the present invention is adapted for use with a copying machine, illustrated in dotted lines and generally designated by numeral 9, of the present invention is adapted for use with a copying machine, illustrated in dotted lines and generally designated 10, which copying machine characteristically has an opening through which the original sheet to be copied is emitted upon completion of the copying process and an opening through which the developed copy of the original is emitted. The copy machine which is fragmentarily illustrated in FIG. 1 is disclosed and claimed in U.S. Pat. No. 3,318,219, granted to 3,318,219, F. Anderson on May 9, 1967, and assigned to the assignee of the present application. Briefly, in the operation of this copying machine, an original sheet is moved between a movable pressure platen 11 and an intermediate web 12, which web is disposed above a glass top of an exposure chamber 14. After the original is exposed to produce a single image on the intermediate web the pressure platen 11 raises and by vacuum through a porous bottom plate holds the original sheet to the face of the same and the intermediate web is advanced about two guide rollers to a position between a heated platen 16 and a curved pressure table 17. At this point a copy sheet is fed from a stack (not shown) unto the curved pressure table and is placed by the pressure table 17 into close uniform contact with the exposed portion of the intermediate strip and against the heated surface of the platen to form on the copy sheet a copy corresponding to the original. The copy sheet is then emitted from the machine through an opening in the side of the machine aligned with the left hand edge, as viewed in FIG. 1 of the heated platen 16 and the curved pressure table 17. After a predetermined number of copies are made of the original sheet the original will be emitted from an opening in the left side of the machine aligned with the surface of the exposure station and the lower portion or face of the pressure platen 11. The original is discharged from the machine disclosed in the aforementioned Anderson patent prior to completion of the last of the predetermined number of copies is discharged.

The distributor of the present invention is constructed and arranged to receive the emitted copies as they are discharged from a copying machine and directs the copies seriatim into separate trays supported to to receive the copy sheets. As the original sheet is discharged from the machine, its is received, directed toward and stacked in a tray. The tray may be one of the copy trays or a tray positioned above the machine 10. The distributor is provided with control means to be hereinafter described which is responsive to the receipt and discharge of each copy sheet to direct the successive copy sheet to the next tray and which, in response to receiving and directing an original sheet into a tray, will reset the directing means for the copy sheets relative to the trays such that upon the beginning of the second run, on the copying of a successive sheet from a document, the copies thereof will be also discharged seriatim into separate trays on top of the copies already placed in said trays.

The distributor illustrated in the accompanying drawings comprises a first control frame 20 removably mounted by a bracket 21 unto a side plate 22 of the copy machine 10. The control frame 20 movably supports a tray-supporting frame 25 which receives the discharged copies of the copying machine.

A plurality of trays 26 are mounted on the tray frame in inclined uniformly spaced parallel relation to receive the copy sheets as they are directed into the trays. The frame 25 is open on the front to permit access to the trays to remove the copies therefrom and is open on the side adjacent the control frame 20 to permit the copies to be discharged into the trays over the upper edge thereof. An adjustable paper stop 27 extends downward through the trays. This paper stop is adjustable to accommodate various lengths of copy sheets and adjustment thereof relative to one tray adjusts it relative to all the trays simultaneously.

The tray frame 25 has a pair of vertically extending channel members 29 and 30 fixed thereto in opposed relation on the side adjacent the upper edges of the trays. These channel members 29 and 30 receive, therebetween and between the flanges thereof, vertically spaced pairs of freely rotatable guide rollers 31 and 32 supported on the control frame. The pairs of guide rollers are supported on shafts extending transversely through spaced front and rear end plates, 34 and 35 respectively, on the control frame as shown most clearly in FIG. 2. Also disposed between the end plates and forming part of the control frame are other transverse frame members 36, 37, 38 and 39 making the frame rigid and providing means for supporting the various elements for receiving and directing the copies and original sheets into the trays. The lower rollers 31 are supported on a shaft 41 extending between the end plates 34 and 35 and the upper set of guide rollers 32 are freely rotated on a drive shaft 42 disposed adjacent the upper portion of the end plates. Generally horizontal, vertically spaced and transversely extending plates form guides through frame 20 for the original sheets and copy sheets. The guide plates 44 and 45 for the original sheets are positioned near the top of the frame 20. The copy sheets are guided between guide plates 46 and 47 positioned below the guide plates for the originals. The plates 44—47 are flared at the ends which receive the sheets to permit positive placement of the sheets and are closer together at the opposite edge to positively direct the sheets into the trays.

Drive means is provided for driving the sheets between the guide plates and these members include shafts 49 and 50 having disposed incrementally along their lengths cylindrical sections, 51 and 52 respectively, of soft resilient foam or sponge material which sponge rollers project through slots in the plates 45 and 47, respectively, to receive the sheets in the guide chutes and direct the same therethrough into the tray. The shafts 49 and 50 are driven through suitable pulleys fixed thereto by a timing belt 54, driven from the output pulley 55 of a motor 56 and gear housing 57. Disposed in the chute formed by the plates 44 and 45 for the original sheet is a feeler 59 positioned to be engaged and biased to an out-of-the-way position and to be returned upon the passage of a sheet through the chute. The feeler operates the contacts of the switch 60 positioned below the plate 45. A similar sensing member or feeler 61 extends downward into the chute for the copy sheet formed between the plates 46 and 47. The feeler 61 actuates a switch 62 upon the passage of a sheet through the copy chute. The switches 60 and 62 sense the occurence of events and energize the control means to perform control functions as will be discussed in more detail hereinafter.

A photoelectric cell 63 is positioned beneath the plate 45 and senses the energization of the light source of the exposure chamber 14 of the copy machine 10 to perform the control function of energizing the motor 56 as will hereinafter be described.

As a sheet is received in the copy chute formed by plates 46 and 47, the sheet is picked up and driven by the rollers 52 and is directed into one of the trays 26. With the machine in the reset or "home" position the lowermost tray 26 in the frame 25 has its upper edge disposed just below the discharge edge of the plate 47 such that the sheet is directed out of the chute and into the tray. Placement of this sheet serves to actuate the sensing device 61 and switch 62 and the position of the copy chute and sheet directing means is adjusted with respect to the trays by lowering the frame 25 to a position placing the upper edge of the second tray aligned below the discharge edge of the plate 47 such that the second sheet discharged from the copy machine will be directed into the second tray. This operation continues until a copy is placed in each tray or until the original sheet is discharged from the copy machine 10 through the chute defined by the plates 44 and 45 actuating the feeler 59. Driving and supporting means are provided affording the incremental movement and positioning of the frame 25 relative to the frame 20 and the discharge chutes. The drive and supporting means comprises vertically spaced similar square or rectangular teeth 65 secured on the inside of each of the opposed channels 29 and 30. Theses teeth 65 are of a size and are spaced such that lowering of the frame 25 relative to the frame 20 a distance corresponding to the height of a tooth and the width of the spacing between the same affords relative movement of the frames a distance equivalent to the spacing between the trays 26. The incremental movement of the frames is afforded by the drive shaft 42 extending between the end plates 34 and 35 and carrying on the extended ends thereof and fixed thereto diametrically disposed hubs or plates 66 and 67 carrying axially extending pins 69 and 70 on each plate. The plates have a length such that the pins 69 and 70 are spaced apart a distance to accommodate one of the teeth 65 between the pins.

The shaft 42 has a gear 71 secured adjacent one end thereof which engages an output drive gear 72 from a gear housing 74 driven from a reversible electric motor 75. Actuation of the motor 75 will rotate the shaft 42 causing rotation of the plates 66 and 67, thus permitting one of the pins engaged between the teeth on the channel to either raise or lower the frame 25, depending upon direction or rotation of the shaft 42. As most clearly illustrated in FIG. 4, rotation of the shaft 42 in a clockwise direction withdraws the upper pin 69 from between two teeth 65 and the lower pin 70 moves along the lower edge of a tooth through the broken line positions raising the frame 25. Movement of the pin 70 through the arc of 180° raises the frame 25 relative to the frame 20, toward the reset or "home" position, and before the completion of the 180° rotation the second pin 69 is again placed between adjacent teeth below the pin 70 to aid in the support of the frame 25. Rotation of the shaft 42 in the counterclockwise direction reverses the operation to lower the frame 25 relative to the frame 20. During operation, to collate the copy sheets as they are discharged from the machine, after each sheet is directed into a tray on the frame 25, the frame is lowered one step by the rotation of the shaft 42 through one-half of a revolution. After one-half of a revolution of the shaft the motor 75 stops and brakes the rotation of the shaft. Control of the motor 75 to stop the same is afforded by a cam 77 secured to the shaft 42. The cam 77 has diametrically spaced detents which cooperate with a follower arm 79 which actuates a switch 80 to indicate the desired rotation of the shaft.

A switch 81 is supported on the end plate 35 to cooperate with a pin 82 supported by the channel 30 to indicate when the frame 25 is lowered relative to the frame 20 to its maximum permissible extent. End plate 34 supports a switch 84 which cooperates with a pin 85 in the channel 29 to indicate when the frame 25 is at its maximum raised position relative to the frame 20.

Additionally, manually operated switches (shown only in the electrical schematic) may be included in the system as will be explained with reference to the electrical schematic to disable the control system or be placed in a "no collate" mode, and to permit manual operation to raise or lower the frame 25 as desired. These switches are operated by buttons made accessible from the side of the frame 20.

The operation of the machine will be explained with the description of the electrical schematic.

When the control circuit is connected to the source of electricity by the plug 86 and frame 25 is in the "home" position, the photocell 63 is positioned to sense the exposure light in the copying machine. When the exposure light comes on to make a copy, the photocell 63 energizes a start relay 87. The start relay 87 then latches itself in through its switch 89 and energizes the sponge roller drive motor 56 through switch 90. The motor 56 is now energized and running. A relay operated switch 91 which is normally closed when a relay 92 is deenergized aids to hold in the relay 87.

When the copy is made and the copy sheet exits the copying machine it enters the copy chute of the frame 20 and is picked up by the driven sponge roll 52 and is driven past the feeler 61 to operate switch 62 which then energizes the relay 92. When relay 92 is energized and when switch 62 returns to its normal position it is latched in by one of its own switches 93, and through the cam operated switch 80 in its normal position. When the relay 92 is energized it also opens the circuit to the relay 87 by opening switch 91. Relay 92 however closes an alternate circuit through a normally open switch 95 to maintain the motor 56 energized.

As the copy sheet leaves the copy chute and the switch 62 returns to its normal position, power is provided through switch 62 and a switch 96 of relay 92 to energize the lower or down windings 97 of the motor 75 to rotate shaft 42. As the frame 25 is moves away from its "home" position the upper limit switch 84 is actuated enabling several circuits for subsequent operation of the control means. Also as the shaft 42 rotates, the cam 77 actuates the switch 80 to open the holding circuit to relay 92 and it is deenergized. When relay 92 is deenergized, motor 56 is deenergized through switch 95 and the circuit to the windings 97 of the motor 75 is opened through switch 96. Motor 75 is operating however until switch 80 is returned to its normal position by the detents on the cam 77. The motor 75 is then stopped. At this point the machine is away from the home position and all circuits are restored and ready for the next copy. Switch 84 has been closed. The above steps are repeated for each copy as it enters the copy chute until one of two things happen. If more copies are fed by the copying machine than there are trays, the lower limit switch 81 will be actuated breaking the circuit to the motor 75 and specifically to windings 97 thereof so the motor will not drive the frame 25 any further. All succeeding copies will then be placed in the last or top copy tray. However, any time an original sheet is discharged from the copying machine it enters the original chute on frame 20 and is picked up and driven by roller 51 past the sensor 59 which actuates switch 60. When switch 60 is actuated it actuates the "last copy" relay 99 which latches in on its own switch 100 through the circuit energized by limit switch 84. The last copy relay 99 sets up several circuits which prepare the control mechanism to move the frame 25 to "home" position after the following or the next copy to be made is discharged from the machine. When the last copy enters the chute and actuates switch 62, relay 92 is energized as before, but it latches in by a switch 98 on the line energized by the switch 84 and the switch 100 of relay 99. When this last copy is placed in the tray the switch 62 is returned to its normal position and power is applied to a motor reversing relay 102 through its own contacts 101 and switch 103 of last copy relay 99. The relay 102 is then energized through its own contacts of the switch 101, switch 100, and switch 84. Relay 102 opens the circuit to the relay 92 through its switch 104 causing relay 92 to drop out immediately. Relay 102 also opens the line to the down windings 97 of the motor 75 through a switch 105 and it closes, through switch 105a, a circuit to energize the return windings 106 of motor 75 through the closed switch 84. The motor 75 will then drive the shaft 42 in the reverse direction to move the frame 25 upward relative to the frame 20 until it opens the home or upper limit switch 84. When switch 84 is opened the return winding 106 of the motor 75 is deenergized together with relay 99 and relay 102. The frame 25 is then at the reset or home position.

If it is desired to put one or more copies of a document in one tray the collation distributor is disabled and frame 25 does not move away from the home position. To effect this a pair of switches 108 and 109 are provided which are manually operated as discussed above. Switch 108 serves to open the circuit to the windings 97 of the motor 75 so the motor cannot drive the frame 25 from home position or other position at which the frame happens to be. Switch 109 permits relay 92 to stay latched only as long as a sheet is in the copy chute actuating switch 62.

A pair of manually operable switches are also provided so that the operator can move the frame 25 up or down as desired. The switch provided for lowering the frame 25 is a switch 111 connected directly to windings 97 of the motor 75 through the lower limit switch 81. The switch for raising the frame 25 is a switch 112 which energizes the relay 102 in order to drive the windings 106 of the motor 75 through the upper limit switch or the home switch 84. In order to prevent the relay 102 from latching in and driving the rack all the way home instead of permitting a step by step movement, a series of diodes is used. A flyback diode network on the relay 102 allows it to latch in on its own contacts. A diode 113 is used in the line of the switch 112 (which is compatible with the flyback network) and can pull in the relay 102.

A modification of the distributor control mechanism and of the original chute is illustrated in FIG. 6. This unit comprises a control frame 20a similar to the control frame 20 however the photocell 63 has been removed and the motor 56 which drives the drive sponge rollers in the original chute and copy chute is energized not by the operation of the exposure light of the copying machine but by a sheet passing between a lamp 120 and the frame 20a and either a photocell 121 beneath the copy chute formed by plates 46a and 47a or by a photocell 122 positioned above the plate 45a forming the bottom guide for the original chute for the original sheet. The circuit for this modification would require an additional circuit to the light source 120. The light from the lamp 120 will fall upon either photocell 121 or 122 until a paper enters the copy chute or the chute blocking the light to the respective photocell. When the light is blocked, the increase in resistance in the particular photocell triggers a solid state switch, for example, a triac, and the triac would then energize the relay 87 and subsequently the motor 56.

The original chute on the control frame 20a is modified to invert and direct the original sheet back over the copy machine to a tray that may be positioned thereabove. This is particularly helpful to collate the original sheets when the original document is placed upside down in a sheet feeder feeding sheets successively off the top of the stack, i.e., bottom sheet first front side down.

The original chute illustrated comprises the lower guide plate 45a which directs the original sheet into the control frame 20a between a shaft 49a having axially spaced feed rollers 51a thereon, and a rotatable tube 126 mounted on a shaft 127 positioned above the tray 45a. A plurality of O-ring belts 128, engageable with the rollers 51a, are spaced axially along the tube 126 to drive the tube and belts to move the original sheet in response to rotation of an upper tube 130 supported by a shaft 131. The upper tube 130 is driven from one end by a belt 132 which in turn is driven by a pulley 134 on a stub shaft 135 suitably geared to the rotatable with the shaft 49a. The belts 128, there may be six or more, and rollers 51a drive the original sheets along a path defined by spaced wire guides 136 adjustably mounted in the frame 20a by a bar 138 mounted from pins 139. A tray (not shown) would be positioned to the right (as shown in FIG. 6) and below the tube 130 to receive the sheets as they are moved through the control frame 20a and discharged at the top by the belts 128.

The present invention thus provides a sheet collation distributor which is easily used with copy machines commercially available and which will operate independent of the circuits of the copy machines. This makes the distributor readily added as a operating unit with the copy machine without mechanical or electrical changes being made to the copy machine.

We claim:

1. A sheet collation distributor adapted for use with a copy machine for the seriatim placement of and the collation of copies for a said machine and the collection of the original sheets of a document, said distributor comprising:

a frame;

a plurality of spaced sheet receiving trays supported on said frame;

means disposed adjacent and affording movement relative to said frame for receiving and directing duplicate copies of an original sheet discharged from the machine seriatim to said trays affording placement of one copy of a said original sheet in a said tray;

means disposed relative to said frame for receiving and stacking a said original sheet when discharged form the machine; and control means responsive to receiving and stacking a said original sheet for resetting said means for directing said duplicate copies with respect to said trays to collate copies of another original sheet seriatim into said trays.

2. A distributor according to claim 1 wherein said means for receiving and directing said duplicate copies and said means for receiving and stacking said original sheet are spaced relative to each other and each comprise:

guide means for receiving the copy or sheet and for directing it along said guide means; and sensing means for sensing the movement of a sheet along said guide means for subsequently energizing said control means to perform a subsequent control function.

3 A distributor according to claim 1 wherein said means movable relative to said frame for directing duplicate copies to said trays is operative to afford said relative movement in response to movement of said duplicate copy to said tray.

4. A distributor according to claim 1 wherein said means affording movement relative to said frame include means for moving said frame and said trays relative to a normal position of said means for receiving and directing duplicate copies and said means for receiving and stacking a said original in response to movement of duplicate copies into said trays.

5. A sheet collation distributor adapted for the seriatim placement of successive copies forming sets of document in separate trays, said distributor comprising:

a control frame;

means on said frame to receive said copies and drive them beyond said frame;

a tray frame movably supported on said control frame for supporting a plurality of equally spaced parallel trays inclined to an edge of said tray frame adjacent said control frame in a manner to permit sheets to move into said trays;

means on said control frame and said tray frame to support said tray frame from said control frame;

means on said control frame actuated in response to movement of a copy therethrough for moving said tray frame relative to said control frame to intermittently position successive trays adjacent said means to receive and feed said copies;

means on said control frame spaced from said means to receive said copies for receiving an original document and stacking it in a tray; and control means, including circuit means, operative upon movement of an original document through said means for receiving an original document for energizing said circuit means to return said tray frame for a position gained by intermittent movement to a start position.

6. A distributor according to claim 5 wherein said means on said frame to receive said copies and drive them beyond said frame comprise:

a chute defined by spaced plates;

a soft sponge roller positioned in said chute for engaging a sheet and moving it therethrough between said plates;

drive means for driving said roller; and means responsive to a sheet entering between said plates for energizing said drive means to drive a said sheet.

7. A distributor according to claim 5 wherein said tray frame has opposed fixed guide members along said edge of said tray frame to receive guide members on said control frame, and said means on said control frame for moving said tray frame comprises a rotatably driven member having projections cooperating with fixed projections on said tray frame and drive means for said driven member.

8 A sheet collator distributor adapted for use with a copy machine for the seriatim placement of an collation of copies from a said machine, said distributor comprising:

a tray frame having supported thereon a plurality of parallel spaced sheet receiving tray;

a control frame adapted to be supported by a said copy machine, said control frame comprising:

means supporting said tray frame for movement relative to said control frame, drive means for moving said tray frame on said support frame, a sheet receiving and transport means, control means for said drive means for moving said tray frame stepwise with the sheet receiving and transport means aligned with a said tray at each step from a home position toward a limit position in response to movement of copy sheets through said sheet receiving and transport means, and for returning said tray frame to said home position in response to a predetermined electrical signal, and means for receiving and directing an original sheet discharged from a copy machine to stack said original sheets.

9. A distributor according to claim 8 wherein said sheet receiving and transport means comprises:

a chute defined by spaced plates;

a soft sponge roller positioned in said chute for engaging a copy sheet and moving it therethrough between said plates;

roller drive means for driving said roller; and means responsive to a copy sheet entering between said plates for energizing said roller drive means to drive a said copy sheet.

10. A distributor according to claim 8 wherein said means for supporting said tray frame comprises opposed fixed guide members along one edge of said tray frame and guide members on said control frame cooperating with said guide members, and said drive means comprises a rotatably driven member having projections cooperating with fixed projections on said frame and drive means for said driven member.

11. A sheet collator distributor adapted for use with a copy machine for the seriatim placement of and the collation of copies from a said machine, said distributor comprising:

a tray frame having supported thereon a plurality of parallel spaced sheet receiving trays;

a control frame adapted to be support by a said copy machine, said control frame comprising:

means supporting said tray frame for movement relative to said control frame, drive means for moving said tray frame on said support frame, a sheet receiving and transport means, and a control means for said drive means for moving said tray frame stepwise with the sheet receiving and transport means aligned with a said tray at each step from a home position toward a limit position in response to movement of copy sheets through said sheet receiving and transport means, and for returning said tray frame to said home position in response to a predetermined electrical signal, and means for receiving and directing an original sheet discharged from a copy machine to a tray, and said control means includes means for sensing the movement of a said original sheet for providing said predetermined signal.

UNITED STATES PATENT OFFICE
CERTIFICATE OF CORRECTION

Patent No. 3,561,754  Dated February 9, 1971

Inventor(s) Bernard W. Gaffron, Logan D. Gilman, and Leo J. S

It is certified that error appears in the above-identified patent and that said Letters Patent are hereby corrected as shown below:

The line numbers are not properly aligned with the li in columns 1 through 6.

Col. 1, line 47, change "1967" to -- these --; col. 1 line 52, delete the first occurrence of "the". Col. 2, delete lines 17 and 18 and the word "designated" on line 1 col. 2, line 25, change "3,318,219" to -- D. --; col. 2, l 51, delete "is discharged"; col. 2, line 55, delete first occurrence of "to"; col. 2, line 56, change "its" to -- it Col. 4, line 13, change "theses" to -- these --. Col. 5, line 22, change "moves" to -- moved --; col. 5, line 43, c "roller" to -- rollers --. Col. 6, line 33, after the sec occurrence of "the" insert -- original --; col. 6, line 56 change first occurrence of "the" to -- and --; col. 6, lin 73, change "for" to -- from --. Col. 7, line 59, change "for" to -- from --. Col. 8, line 7, change "an" to -- an col. 8, line 10, change "tray" to -- trays --.

Signed and sealed this 21st day of September 1971.

(SEAL)
Attest:

EDWARD M. FLETCHER, JR.
Attesting Officer

ROBERT GOTTSCHALK
Acting Commissioner of Pat